US011525353B2

(12) United States Patent
Song et al.

(10) Patent No.: US 11,525,353 B2
(45) Date of Patent: Dec. 13, 2022

(54) SYSTEM AND METHODS FOR EVALUATING A FORMATION USING PIXELATED SOLUTIONS OF FORMATION DATA

(71) Applicant: Halliburton Energy Services, Inc., Houston, TX (US)

(72) Inventors: Rencheng Song, Singapore (SG); Li Pan, Singapore (SG); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/773,511

(22) PCT Filed: May 8, 2017

(86) PCT No.: PCT/US2017/031607
§ 371 (c)(1),
(2) Date: May 3, 2018

(87) PCT Pub. No.: WO2018/208282
PCT Pub. Date: Nov. 15, 2018

(65) Prior Publication Data
US 2019/0078435 A1    Mar. 14, 2019

(51) Int. Cl.
*G01V 3/18* (2006.01)
*E21B 47/12* (2012.01)
(Continued)

(52) U.S. Cl.
CPC ............ *E21B 47/13* (2020.05); *E21B 7/06* (2013.01); *E21B 47/026* (2013.01);
(Continued)

(58) Field of Classification Search
None
See application file for complete search history.

(56) References Cited

U.S. PATENT DOCUMENTS

| | | | |
|---|---|---|---|
| 2006/0017442 A1 | 1/2006 | Folberth | |
| 2006/0195264 A1 | 8/2006 | Galil El Askary | |
| | | (Continued) | |

FOREIGN PATENT DOCUMENTS

| | | | |
|---|---|---|---|
| CA | 2913827 A1 | 3/2016 | |
| WO | 2014098919 A1 | 6/2014 | |

OTHER PUBLICATIONS

PCT International Search Report and Written Opinion dated Dec. 15, 2017 issued in corresponding application No. PCT/US2017/031607 filed on May 8, 2017, 10 pgs.

*Primary Examiner* — Curtis A Kuntz
*Assistant Examiner* — Jerold B Murphy
(74) *Attorney, Agent, or Firm* — K&L Gates LLP (57) ABSTRACT

A system and method for evaluating a subterranean earth formation as well as a method of steering a drill bit in a subterranean earth formation. The system comprises a logging tool that is operable to measure formation data and locatable in a wellbore intersecting the subterranean earth formation. The system also comprises a processor that is in communication with the logging tool. The processor is operable to calculate multiple distance-to-bed-boundary (DTBB) solutions using the measured formation data, identify DTBB solutions that satisfy a threshold, convert the identified solutions into pixelated solutions by dividing the identified solutions into pixels, generate a formation model based on the pixelated solutions, and evaluate the formation using the generated formation model.

20 Claims, 9 Drawing Sheets

(51) Int. Cl.
  *G01V 3/38* (2006.01)
  *G01V 3/26* (2006.01)
  *E21B 47/026* (2006.01)
  *E21B 47/0228* (2012.01)
  *E21B 47/13* (2012.01)
  *E21B 7/06* (2006.01)
  *G01V 3/02* (2006.01)
  *G01V 3/34* (2006.01)
  *G06F 17/13* (2006.01)

(52) U.S. Cl.
  CPC ............ *E21B 47/0228* (2020.05); *G01V 3/02* (2013.01); *G01V 3/26* (2013.01); *G01V 3/34* (2013.01); *G01V 3/38* (2013.01); *G06F 17/13* (2013.01)

(56) References Cited

U.S. PATENT DOCUMENTS

| | | | |
|---|---|---|---|
| 2008/0296064 A1 | 12/2008 | Al Hadhrami | |
| 2010/0176812 A1 | 7/2010 | Bittar et al. | |
| 2012/0179379 A1 | 7/2012 | Alshawaf et al. | |
| 2012/0215628 A1* | 8/2012 | Williams | G06Q 30/02 705/14.49 |
| 2014/0102794 A1 | 4/2014 | Tevis et al. | |
| 2014/0240141 A1* | 8/2014 | Logan | E21B 47/122 340/854.6 |
| 2015/0035536 A1 | 2/2015 | Tang | |
| 2015/0106017 A1 | 4/2015 | Vanek | |
| 2016/0245080 A1* | 8/2016 | Sun | G01V 3/38 |
| 2016/0246080 A1 | 8/2016 | Eissler et al. | |
| 2017/0075021 A1* | 3/2017 | Thiel | G01V 3/20 |
| 2018/0321415 A1* | 11/2018 | Thiel | E21B 7/04 |

* cited by examiner

SYSTEM AND METHODS FOR EVALUATING A FORMATION USING PIXELATED SOLUTIONS OF FORMATION DATA

BACKGROUND

This section is intended to provide relevant background information to facilitate a better understanding of the various aspects of the described embodiments. Accordingly, it should be understood that these statements are to be read in this light and not as admissions of prior art.

Petroleum drilling and production operations demand a great quantity of information relating to the parameters and conditions downhole. Such information may include the location and orientation of the wellbore and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools are used in LWD applications. One such tool is the resistivity tool, which includes one or more antennas for receiving a formation response and may include one or more antennas for transmitting an electromagnetic signal into the formation. When operated at low frequencies, the resistivity tool may be called an induction tool, and at high frequencies the resistivity tool may be called an electromagnetic wave propagation tool. Though the physical phenomena that dominate the measurement may vary with frequency, the operating principles for the tool are consistent. In some cases, the amplitude and/or the phase of the received signals are compared to the amplitude and/or phase of the transmit signals to measure the formation resistivity. In other cases, the amplitude and/or phase of multiple receive signals are compared to each other to measure the formation resistivity.

A layered model-based inversion has been used in the electromagnetic resistivity logging tools to identify major boundaries between different formation resistivities. One-dimensional (1D) formation assumption is typically used in the inversion as well, where each layered boundary is parallel from one to another. The formation assumptions are fairly true owing to the detection range of the measurements used in the inversion. Generally speaking, the typical detection range of the conventional resistivity logging tools is around 5 (1.5 meters) to 10 feet (3 meters) and the maximum detection is around 18 feet (5.5 meters).

Ultra-deep resistivity logging tools detect formation boundaries 100 feet (30.5 meters) radially outward from the tool, which provides a much deeper detection range than conventional logging tools. Within the depth of investigation, there are usually multiple layers and a qualitative method such as correlation fails due to the complexity. A boundary mapping algorithm such as a distance-to-bedboundary (DTBB) inversion algorithm is used to interpret the tool responses qualitatively and evaluate the subterranean earth formation to identify formation zones that are suitable for producing formation fluids, such as hydrocarbons.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
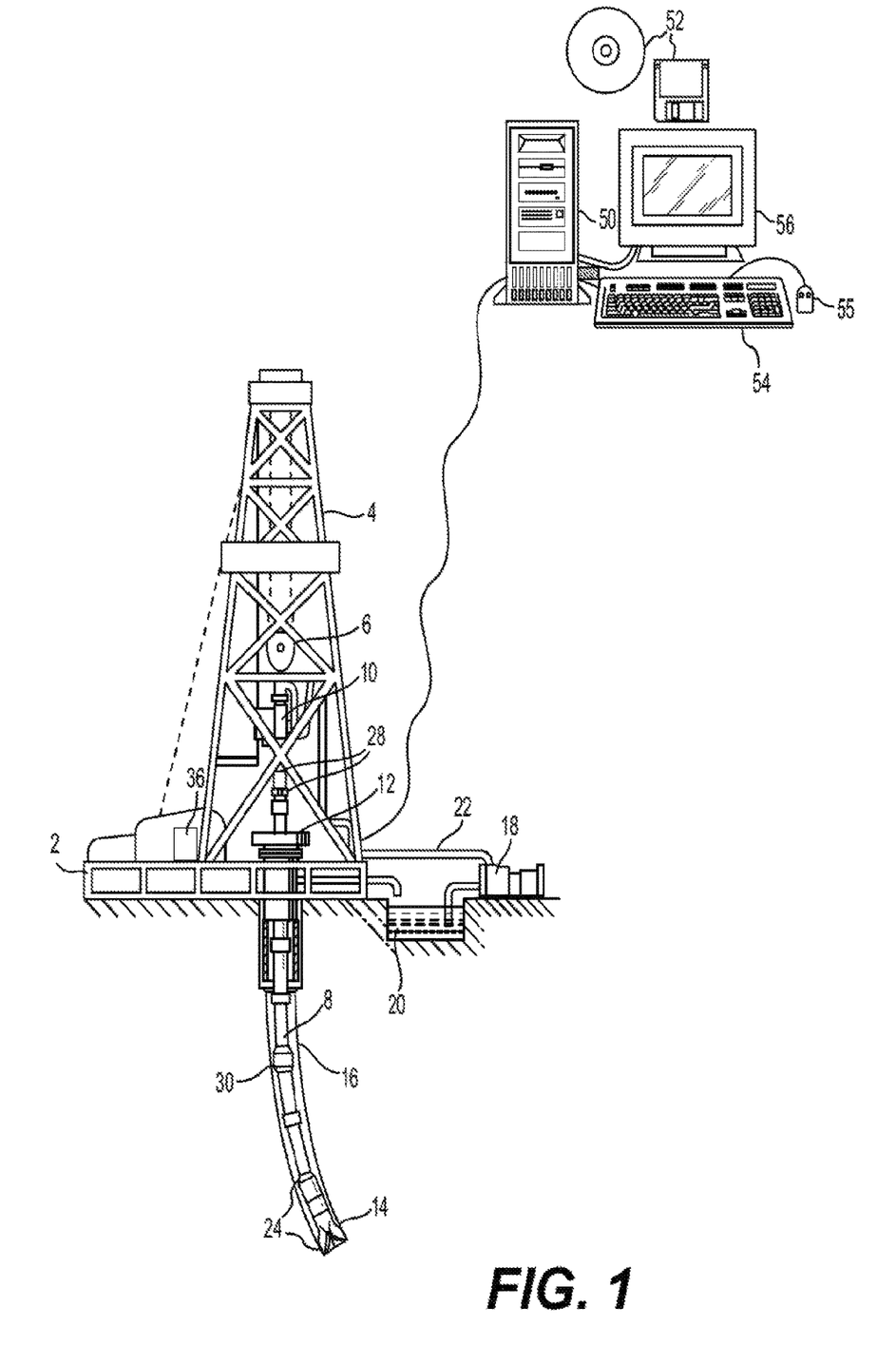
FIG. 1 depicts an elevation view of a logging-while-drilling environment, according to one or more embodiments.

FIG. 1 shows one or more embodiments of an illustrative LWD environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a wellbore 16 that passes through various formations. A pump 18 circulates drilling fluid 20 through a feed pipe 22, through the interior of the drill string 8 to drill bit 14. The fluid exits through orifices in the drill hit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipe) that provide weight and rigidity to aid the drilling process. Some of these drill collars include built-in logging instruments to gather measurements of various drilling parameters such as location, is orientation, weight-on-bit, wellbore diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

The bottom-hole assembly 24 may include a device for measuring formation resistivity, a gamma ray device for measuring formation gamma ray intensity, devices for measuring the inclination and azimuth of the drill string 8, pressure sensors for measuring wellbore pressure, temperature sensors for measuring wellbore temperature, etc. Also included in bottom-hole assembly 24 is a telemetry sub that maintains a communications link with the surface. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the signal. At the surface, transducers 28 convert signals between mechanical and electrical form, enabling a network interface module 36 to receive the uplink signal from the telemetry sub and (at least in some embodiments) transmit a downlink signal to the telemetry sub.

A computer system 50 located at the surface receives a digital telemetry signal, demodulates the signal, and displays the tool data or well logs to a user. Although FIG. 1 depicts the computer system 50 as being hardwired to the telemetry system, it should be appreciated that the computer system 50 may be in wireless communication with the telemetry system. The computer system 50 may include a processor and a non-transitory machine-readable medium 53 (e.g., ROM, EPROM, EEPROM, flash memory, RAM, a hard drive, a solid state disk, an optical disk, or a combination thereof) capable of executing instructions. The processor of the computer system 50 may include one or more processors located at the surface or in the wellbore, such as integrated with the bottom-hole assembly 24. Software (represented in FIG. 1 as the non-transitory machine-readable medium 52) governs the operation of the system 50. A user interacts with the system 50 and the software 52 via one or more input devices 54 and 55 and one or more output devices 56. In some system embodiments, a driller employs the system 50 to make geosteering decisions (e.g., modifying the wellbore trajectory or steering the drill bit 14) and communicate appropriate commands to the bottom-hole assembly 24 to execute those decisions. The computer system 50 is operable to perform calculations or operations to evaluate the formation, identify formation boundary positions, and/or steer the drill bit 14 as further described herein.

The drillstring shown in FIG. 1 illustrates a directional drilling operation, wherein drilling is performed along a path other than a straight vertical path downward. In at least some illustrative embodiments, the change in direction is achieved using a "bent sub," which is a tubular section along the drillstring near the drill bit that is bent or curved. The bend or curve may be fixed or variable, with the direction of the drilling being determined either by the bend alone, or by a combination of the bend and the rotation of the drillstring. For example, if a downhole motor is used to drive the drill bit and a drillstring with a fixed bent sub is maintained at a fixed azimuthal orientation, the drill string will gradually change direction towards the direction of the bend. If instead such a drillstring is rotated, drilling will progress along a line parallel to the drillstring section above the bend and about which the drill bit processes.

For drillstrings capable of varying the angle of the bent sub, the sub is set to a desired angle and direction while the drillstring is maintained at a desired fixed azimuthal orientation, with the drill bit being driven by the downhole motor. This is sometimes referred to as "slide drilling," as the drillstring slides through the wellbore without rotating. In other drillstring embodiments, the drillstring continues to be rotated and the angle of the bent sub is maintained by applying a force on the drillstring in a specific direction. This causes the sub to be pushed into the wellbore wall opposite the desired drilling direction to create an angle between the drillstring pipes and/or bottom-hole assembly units to either side of the sub. Such systems are sometimes referred to as rotary steerable systems.

Because of the angle change introduced by the above-described subs and systems used in directional drilling, and because of the bends produced in the drillstring by the resulting wellbore, logging tool subs located along the length of the drillstring may be oriented in different directions. This is particularly true for logging tools utilized in deep formation evaluation (i.e., tools wherein a transmitter antenna is separated from a receive antenna by at least 20 feet), as the transmit and receive antennas used in such tools may be housed in logging tool subs that are separated by larger distances (compared to other logging tools) in order to achieve the desired formation penetration of the transmitted signals. The greater the distance between the logging tool subs, the greater the inclination and strike angle differences may be between drillstring sections traversing a wellbore path that is curved or otherwise not a straight line. As used herein, the inclination angle of an LWD tool sub that houses an antenna is defined as the angle between a vertical z axis and the drillstring's z axis local to said antenna. The strike angle is defined as the angle between a reference vector normal to a vertical z axis and a projection onto a horizontal x-y plane of the drillstring's z axis local to the antenna.

Figure 2:
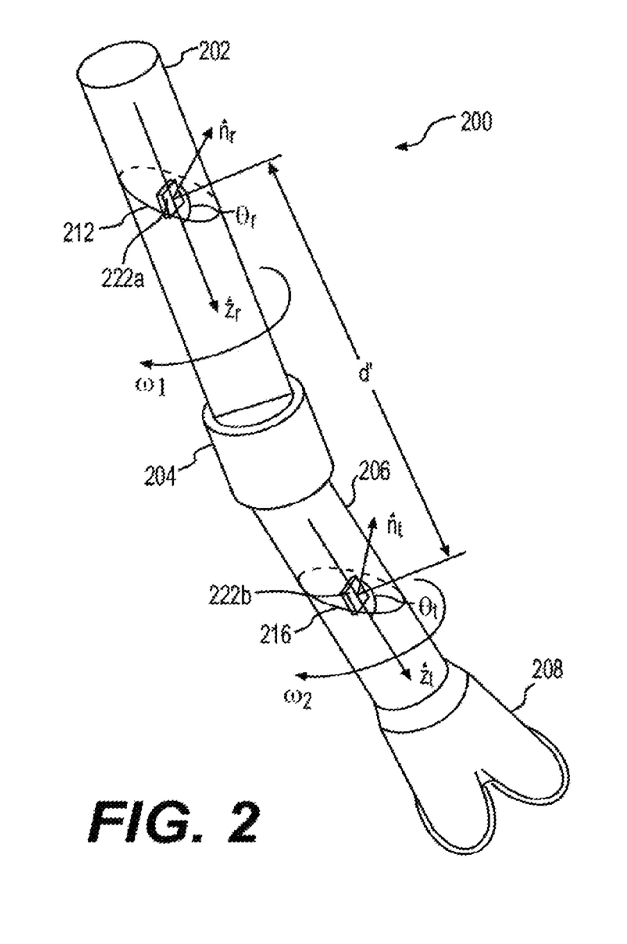
FIG. 2 depicts a schematic view of a resistivity logging tool, according to one or more embodiments.

FIG. 2 shows a schematic view of a deep resistivity logging tool 200, in accordance with one or more embodiments. The resistivity logging tool 200 may be included with the bottom-hole assembly 24 of FIG. 1 and includes two LWD tool subs 202 and 206 at different locations and orientations along a drillstring. A resistivity logging tool receive antenna 212 and a corresponding receive antenna position measurement device 222a are housed within the LWD tool sub 202, while a resistivity logging tool transmit antenna 216 and a corresponding transmit antenna position measurement device 222b (components of an "at bit" instrument) are housed within the LWD tool sub 206 and closer to the drill bit 208. The position measurement devices 222a, b locate the position of each corresponding antenna, which may be expressed, for example, in terms of each antenna's tilt angle ($\theta_r$ and $\theta_t$ relative to the $z_r$ and $z_t$ axes respectively; generally fixed and known), each antenna's azimuthal angle ($\alpha_r$ and $\alpha_t$ relative to the x axis), each LWD tool sub's inclination angle ($\phi_r$ and $\phi_t$), and the distance d' between the antennas. Various methods may be used to locate the antenna positions (e.g., relative to a reference position on the surface). It should be noted that although the bent sub angles are typically less than five degrees, the illustration shown has a much more pronounced angles to better illustrate the effect of the angles on the relative spatial locations of the antennas, described in more detail below.

The resistivity logging tool 200 in communication with the computer system 50 of FIG. 1 is used to measure formation data, which is used to evaluate the formation and/or determine a wellbore trajectory to produce formation fluids, such as hydrocarbon fluids. It should be appreciated that the resistivity logging tool 200 is an exemplary tool for measuring formation data and other suitable logging tools may be used. Also, other resistivity logging tools may employ different antenna configurations to evaluate the formation.

The formation data measured may be used to generate a resistivity model of the formation and determine the uncertainty of a parameter included in or determined from the formation data. A resistivity model may be used to identify boundary positions between formation layers and determine the wellbore trajectory to produce formation fluids. The uncertainty of a parameter indicates a range of suitable values for a particular parameter such as the uncertainty of resistivity values or boundary positions of formation layers. For instance, the uncertainty of a boundary position provides an indication of where a formation boundary may be located and the extent to which that formation boundary position may vary. As used herein, the uncertainty of a parameter refers to a range of suitable values for the parameter or a measure that is used to quantify a variation in the parameter (e.g., standard deviation). The parameter may include any one or any combination of a horizontal resistivity, vertical resistivity, conductivity, an anisotropy ratio, a boundary position of formation layers, and a formation dip.

Figure 3:
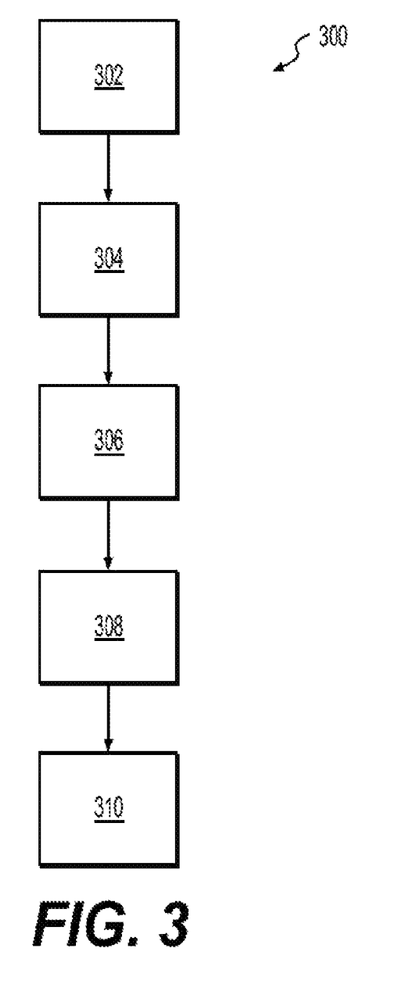
FIG. 3 depicts a diagram view of a pixelation method, according to one or more embodiments.

FIG. 3 shows a flow chart of a method 300 to generate a formation model using formation data measured from the resistivity logging tool 200 of FIG. 2, in accordance with one or more embodiments. At block 302, the formation data is used to generate DTBB solutions using a DTBB inversion method. At block 304, the DTBB solutions are filtered to yield the DTBB solutions that fit best to the measured formation data. At block 306, filtered solutions are converted into pixelated solutions as further described herein. The pixelated solutions provide an efficient way of analyzing DTBB solutions representing varying numbers of formation layers. At block 308, an average of the pixelated solutions may be used to generate a formation model summarizing the DTBB solutions. At block 310, the formation model may be used to evaluate the formation, develop a wellbore trajectory, or steer a drill bit to produce formation fluids.

At block 302, to generate a resistivity model of the formation, multiple guesses are applied to a DTBB inversion method to provide multiple DTBB solutions that best fit to the measured formation data. The DTBB inversions are run with multiple random initial guesses with one or more formation layers. At block 304, after inversion, the DTBB solutions, which may include several hundred solutions, are identified by the extent of the misfit with the measured formation data. The DTBB solutions that satisfy a threshold (e.g., a minimal residual solution) may be identified for further processing. The DTBB solutions that fit best with the formation measurements are selected as the final solutions. The DTBB inversion and solution selection process is done repeatedly on each logging point or measurement depth of the resistivity logging tool.

Figure 4:
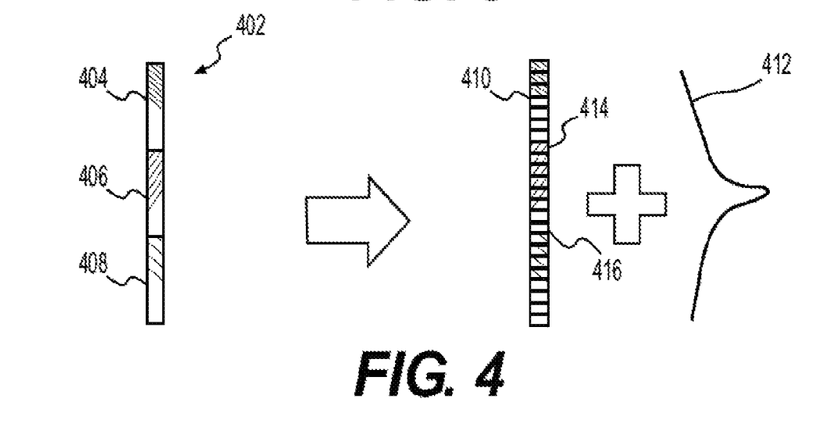
FIG. 4 depicts a graph view of a formation model, according to one or more embodiments.

At block 306, once the solutions are identified, the solutions are converted into pixelated solutions, which partition the solutions into pixels representing one or more formation parameter values at a particular true vertical depth (TVD) or a range of TVDs depending on the pixel width. As an example, FIG. 4 shows a diagram view of converting an inversion solution 302, which comprises three different formation layers (404, 406, and 408), to a pixelated solution 410, according to one or more embodiments. The inversion solution 402 is a 3-layer solution providing three different formation layers. Each identified solution may be divided into pixels including formation parameter information (e.g., horizontal resistivity, vertical resistivity, conductivity, anisotropy ratio, and formation dip) as a function of true vertical depth. Each pixel may have a constant width along the TVD direction, and thus, a pixel represents one or more formation parameters at a particular TVD or a range of TVDs depending on the pixel width along the TVD direction. A weighted function 412 may also be applied to the pixels to adjust the values of certain pixels and compensate for any uncertainties in the pixelated solution. For example, the pixels far away from the tool position, which are less sensitive to resistivity boundaries, can be adjusted to account for inaccuracies. Once converted to a pixelated solution, the boundary positions are represented implicitly by pixels located at boundaries of resistivity contrasts 414 and 416. The pixelated solutions thus provide an efficient way of analyzing DTBB solutions with different layer numbers as further described herein. Alternatively, a statistical analysis, such as P5, P50, or P95, may also be applied to the pixels to generate the final pixelated inversion solution.

The pixelated solutions may be summarized using a model average of the pixels at each measurement depth and a TVD or a range of TVDs. Therefore, at block 308, a model average scheme may be used to generate a formation model of the pixelated DTBB solutions. A mathematical mean, including algebraic, geometric or harmonic mean:

$$H = \frac{1}{n\sum_{i=1}^{n} x_i}, \quad H = \left(\prod_{i=1}^{n} x_i\right)^{1/n}, \quad \frac{1}{H} = 1/n \sum_{i=1}^{n} 1/x_i$$

may be applied to the selected solutions to calculate a formation model, where H is the mean value and $\{x_i\}$ are the pixels of the pixelated solutions for a particular measurement depth and a TVD or range of TVDs depending on the pixel width.

Figure 5:
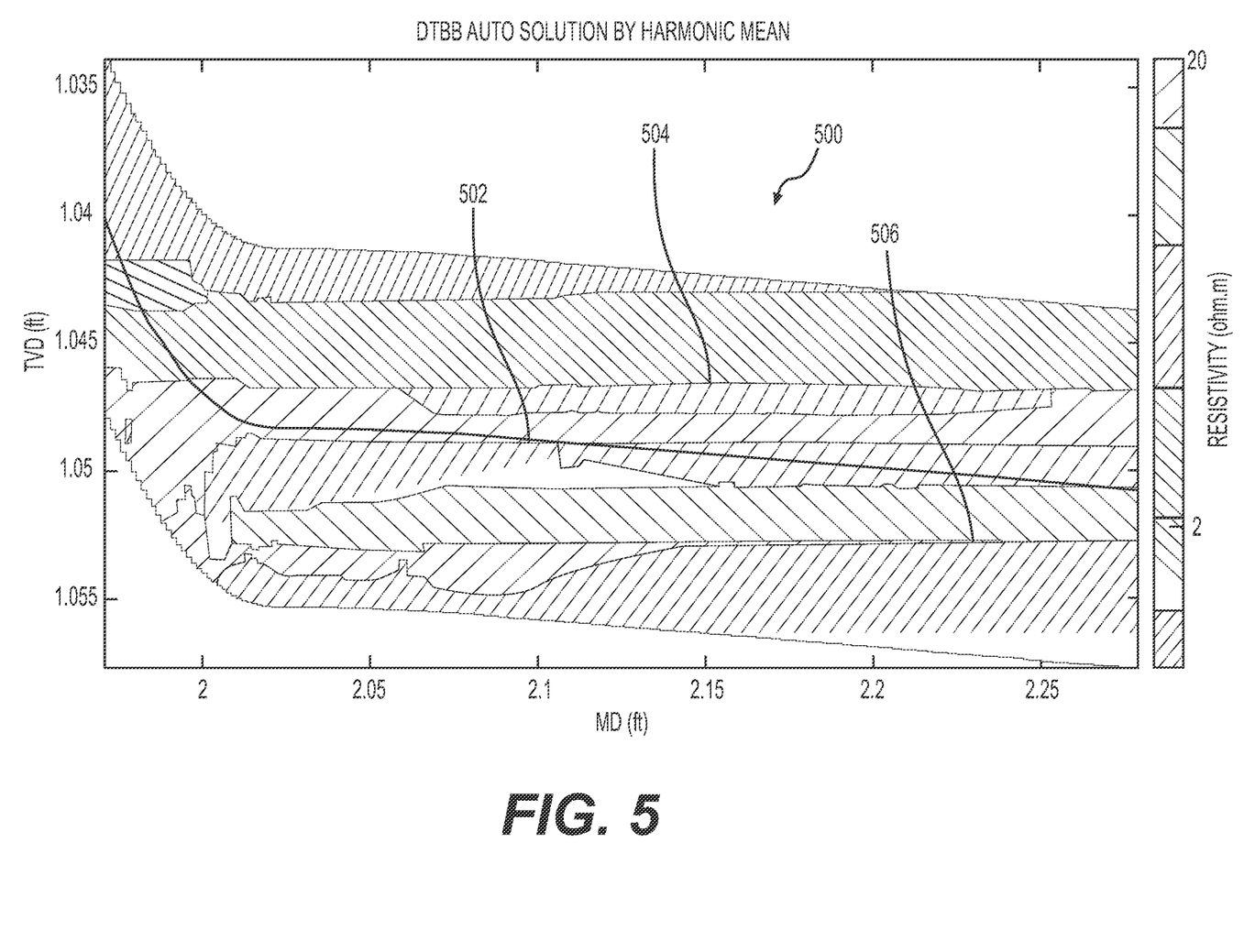
FIG. 5 depicts a graph view of a resistivity profile, according to one or more embodiments.

FIG. 5 shows a graph view of a formation model 500 generated using synthetic DTBB formation data, in accordance with one or more embodiments. The formation model 500 is the harmonic model average of the pixelated solutions for each measurement depth. The formation model 500 condenses hundreds of inversion solutions for each measurement depth into a single graph and provides an efficient data set to evaluate the formation. As shown, the graph is a contour plot of horizontal resistivity (ohm-m) as a function of measurement depth (x-axis) with respect to the true vertical depth (y-axis). Each measurement depth is the harmonic average of pixelated solutions. At block 310, a wellbore trajectory 502 may be developed to penetrate one or more formation layers suitable for producing formation fluids, such as hydrocarbons. Contrasts in resistivity (404 and 406) demonstrate formation boundary positions between formation layers comprising different formation properties, such as shale, limestone, sandstone, gas-bearing sandstone, oil-bearing limestone, etc. The boundary positions of the formation layers identified in the formation model 400 can be used to steer the drill bit towards a suitable formation layer or identify the wellbore trajectory 402 to penetrate one or more formation layers for production, such as formation layers suitable for production of formation fluids. For instance, the wellbore trajectory 402 may be identified to advance predominantly between formation boundary positions identified based on the contrasts in resistivity 404 and 406.

The various mathematical means provide different interpretations of the formation model. For example, the algebraic mean calculates the mean of the resistivity in ohm-m directly. The geometric mean calculates the mean on a logarithmic scale of resistivity. The algebraic and geometric means are mathematical means that can highlight the models with large resistivity values. The harmonic mean calculates the mean of the conductivity and then converts the mean conductivity to resistivity. For an induction based resistivity LWD tool, the harmonic mean is usually used because the tool is sensitive to conductivity instead of resistivity. Therefore, pixels with large conductivity may be highlighted when calculating the mean from the measurements of an induction logging tool. The differences among the mean values calculated with the various mathematical means may also represent a parameter uncertainty.

The model average can also be calculated by not including outlier pixels among the pixelated solutions in the mean calculation. One or more pixels from a pixelated solution (e.g., a set of pixels or an entire pixelated solution) can be removed from the solution set before taking the average if the pixels are considered to be outliers. As used herein, an outlier pixel may be a pixel that fails to satisfy a threshold value or condition. It should be appreciated that the parameter used to identify outlier pixels may be any one or any combination of formation parameters including horizontal resistivity, vertical resistivity, conductivity, anisotropy ratio, and formation dip.

One example of a mean value with refinement to discard outlier pixels is the trimmed mean, which calculates the mean after discarding given parts of a probability distribution or samples (e.g., the pixels at a particular TVD and measurement depth) at the highest and/or lowest values among the pixels. The pixels are sequenced for a particular TVD and measurement depth, and the pixels within the highest and lowest values for a given percentage (e.g., the highest and lowest 20%) are discarded. The highest and lowest percentages may serve as a threshold value to refine the pixelated solutions. Only the pixels retained are averaged to define the final solution, e.g., a resistivity model of the formation.

Another example of the refinement process is that the standard deviation may be used as a threshold value to identify the outlier pixels. The pixels satisfying the following expression:

$$I = |x_i - H| \leq c \cdot S$$

may be used as a condition for discarding outliers and calculate the mean, where c is a coefficient (e.g., 0.5), S is the standard deviation of the pixel solutions for that particular true vertical depth and measurement depth, and I is the set of pixels that satisfy the condition that the absolute difference from the mean (H) of a pixel ($x_i$) is less than or equal to the weighted standard deviation. Likewise, the absolute difference from the mean satisfying a separate threshold value can also be used as a condition to filter outlier pixels in calculating the model average.

The standard deviation S may also be used to determine the uncertainty of a parameter included in the final formation model, which is calculated based on the mean of the pixelated solutions. The standard deviation S is given by the expression:

$$S = \sqrt{\frac{1}{n-1} \sum_{i=1}^{n} (x_i - H)^2}$$

where H is the mean pixel among pixelated solutions, which can be calculated using various mathematical means (e.g., algebraic, geometric or harmonic mean) as previously discussed. As previously discussed, the uncertainty of a parameter provides an indication of the extent to which the value of a parameter (e.g., horizontal resistivity or formation dip) may vary.

Figure 6:
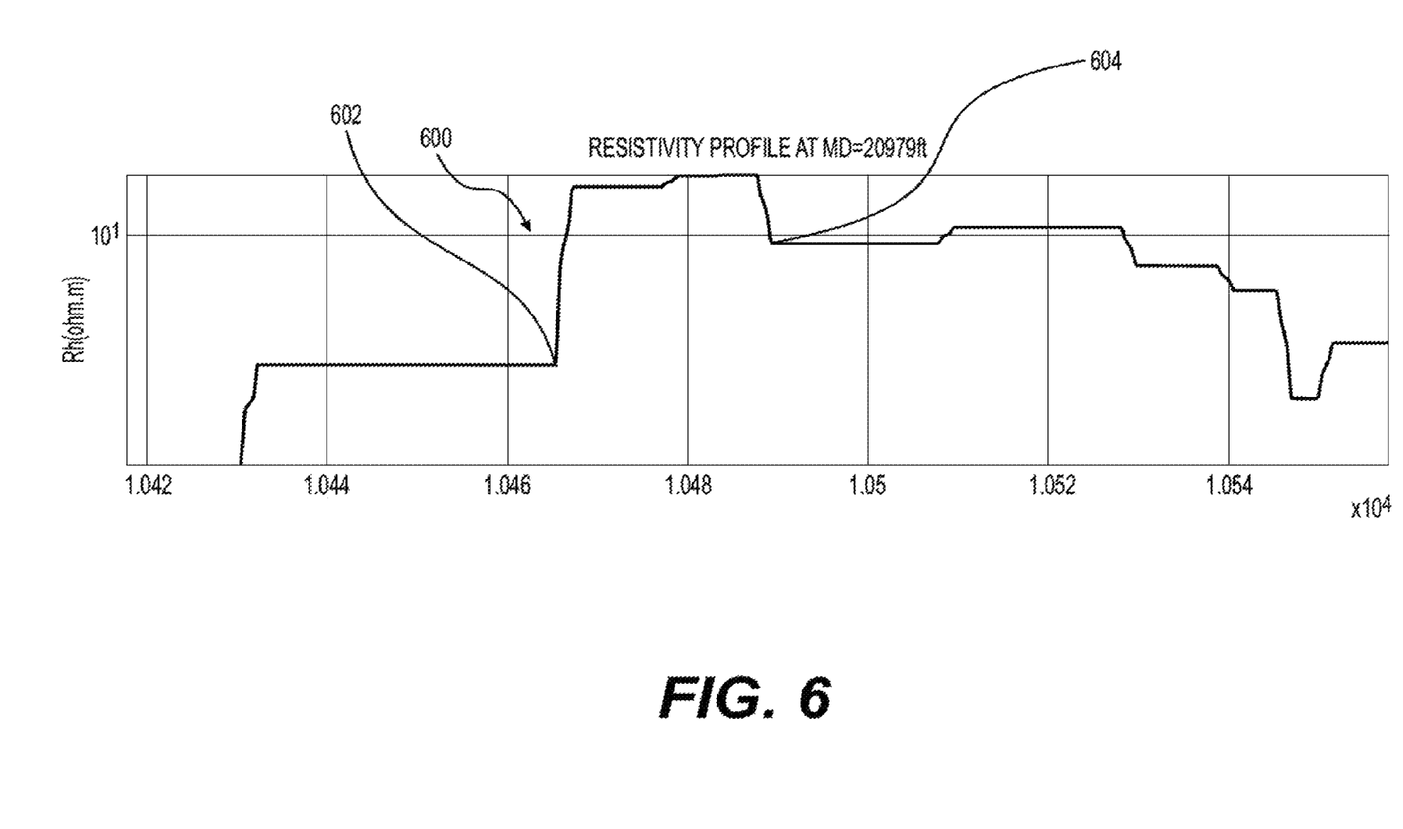
FIG. 6 depicts a graph view of the uncertainty of the resistivity profile of FIG. 5, according to one or more embodiments.

FIG. 6 shows a graph view of a resistivity profile 600, in accordance with one or more embodiments. The resistivity profile 600 is the average of the pixelated solutions for the horizontal resistivity at a particular measurement depth (20,979 feet/6394 meters) based on the same synthetic DTBB formation data used in FIG. 5. The resistivity profile 600 is generated by determining the average of the pixelated solutions for a corresponding TVD or a range of TVDs depending on the pixel width. The resistivity profile 600 is depicted as a function of true vertical depth and may be viewed as taking a vertical slice from a particular measurement depth (20,979 feet/6394 meters) of the averaged horizontal resistivity depicted in FIG. 5. Similar to FIG. 5, the resistivity profile 600 may be used to identify formation boundaries at TVDs of resistivity contrast 602 and 604.

Figure 7:
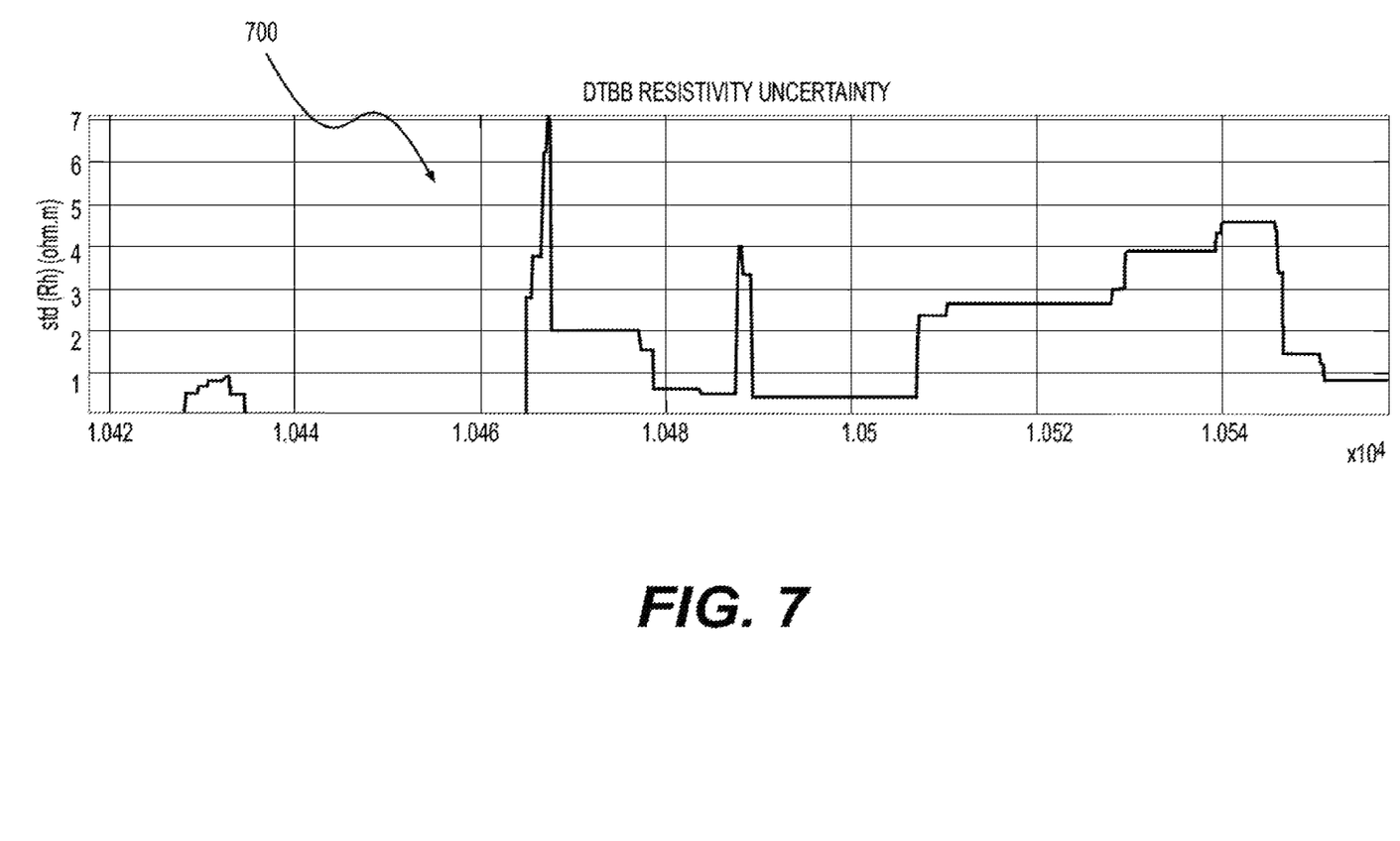
FIG. 7 depicts a graph view of the resistivity uncertainty as a contour plot, according to one or more embodiments.

FIG. 7 shows a graph view of the uncertainty of the resistivity profile 700 determined from the pixelated solutions, in accordance with one or more embodiments. The uncertainty of the resistivity profile 700 is the standard deviation of resistivity profile depicted in FIG. 6. As shown, the uncertainty profile 700 is a function of true vertical depth at a particular measurement depth (20,979 feet/6394 meters) and provides an indication of the range of suitable values for the resistivity at a particular TVD or a range of TVDs depending on the pixel width. The uncertainty profile 700 may also be used to identify formation boundary positions, which in turn facilitates developing a wellbore trajectory or steering the drill bit towards a formation layer suitable for production of formation fluids.

Figure 8:
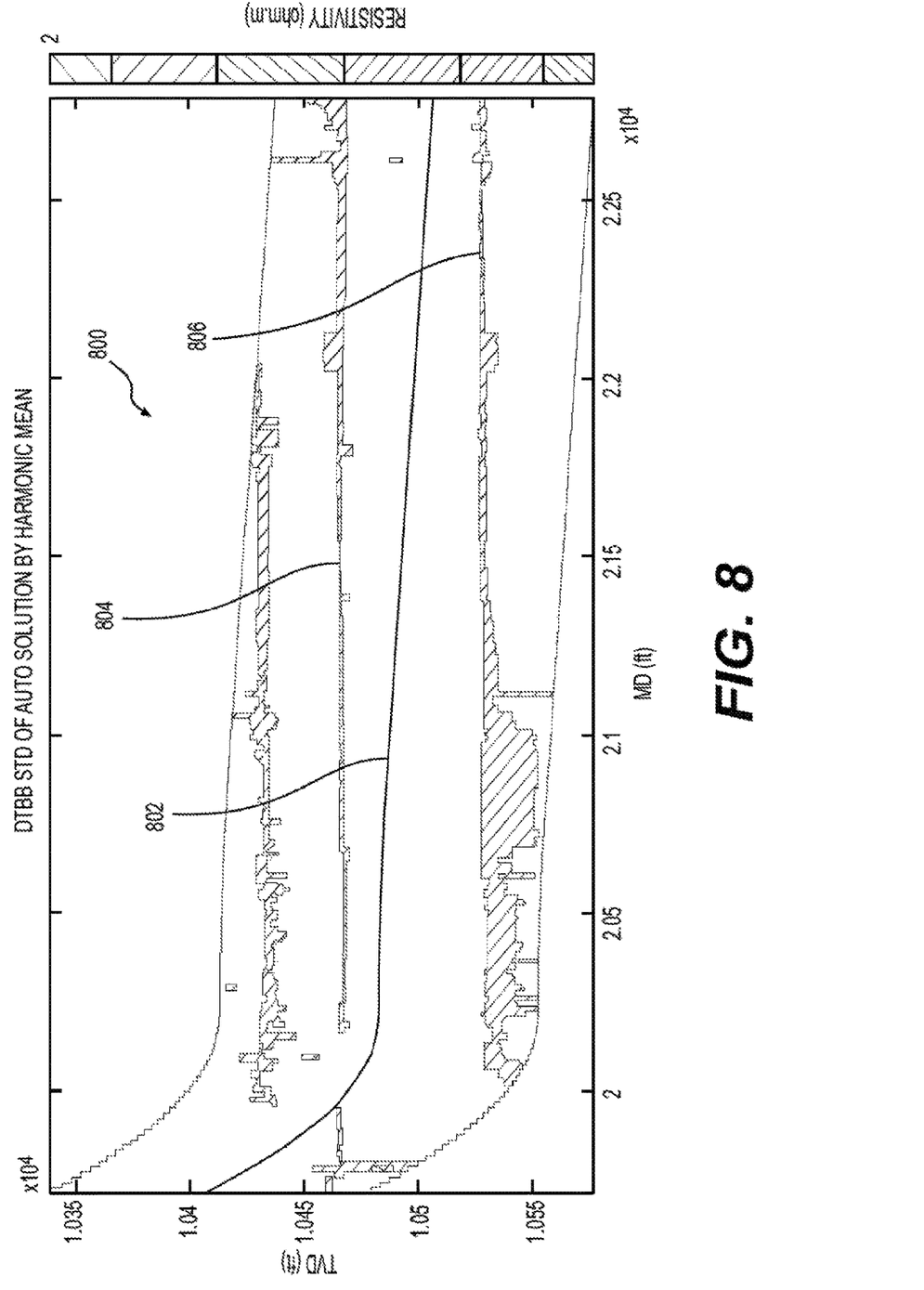
FIG. 8 depicts a graph view of a formation boundary uncertainty profile, according to one or more embodiments.

FIG. 8 shows a graph view of the resistivity uncertainty 800, in accordance with one or more embodiments. The resistivity uncertainty 800 is the standard deviation of the pixelated solutions for horizontal resistivity based on the same synthetic DTBB formation data used in FIG. 5. The standard deviation 700 for the horizontal resistivity is depicted as a contour plot of horizontal resistivity as a function of measurement depth (x-axis) with respect to the true vertical depth (y-axis). As shown, a wellbore trajectory 802 may be developed to penetrate one or more formation layers suitable for producing formation fluids, such as hydrocarbons. Boundary positions between different formation layers may be identified using the contour plot of the resistivity uncertainty 800 by identifying areas of contrast in the resistivity uncertainty (804 and 806). The standard deviation may also be used to determine the uncertainty of other parameters including but not limited to vertical resistivity, conductivity, anisotropy ratio, and formation dip.

As boundary positions are represented implicitly based on the contrast among resistivity pixels, as depicted in FIGS. 5 and 6, the boundary positions may also be identified using a first order derivative g of the horizontal resistivity $R_h$:

$$g = D(R_h)$$

where D represents the differential operator. The derivative of the horizontal resistivity g approaches zero within a formation layer, whereas peaks (local minima or maxima) of the derivative g indicate boundary positions. A peak threshold may be used to discard small oscillations in the derivative and inaccurate indications of a boundary position. The derivative g can also be smoothed before determining the uncertainty of the boundary positions to enhance the determination of the uncertainty of the boundary position. For example, the derivative g may be smoothed by applying a filter, including but not limited to a convolution given by the expression:

$$\frac{\partial}{\partial x}(R_h * u) = \frac{\partial R_h}{\partial x} * u$$

where * is the convolution operator, $R_h$ is the mean horizontal resistivity pixel, x is the pixel at a true vertical depth, and u is a smoothing function. The derivative g may also be smoothed by applying other suitable smoothing filters including but not limited to a Gaussian filter.

The uncertainty of a boundary position can be identified by the width of a peak found in the derivative g. The boundary uncertainty includes but is not limited to the full peak width or a value less than the full width of the peak (e.g., a half width). If the averaged horizontal resistivity includes sharp contrasts in resistivity, the boundary uncertainty may be relatively small as the pixelated solutions indicate the same or similar boundary positions. On the other hand, if the averaged horizontal resistivity gradually changes, the boundary uncertainty may be large indicating a large variation in the boundary position among the pixelated solutions.

Figure 9:
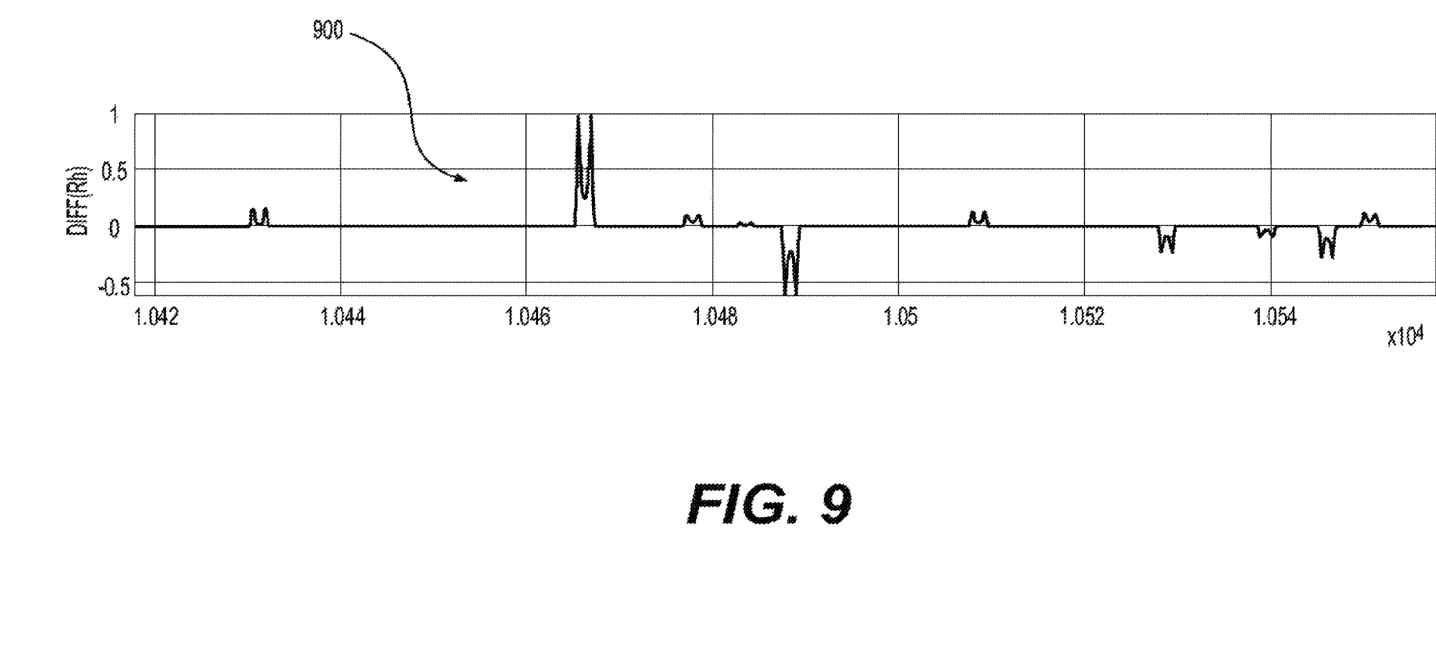
FIG. 9 depicts a graph view of the smoothed uncertainty profile of FIG. 8, according to one or more embodiments.

FIG. 9 shows a graph view of a boundary uncertainty profile 800, in accordance with one or more embodiments. The boundary uncertainty profile 900 is determined by calculating the first derivative of the resistivity profile 600 depicted in FIG. 6. The boundary uncertainty profile 900 is depicted as a function of true vertical depth similar to the profiles of FIGS. 6 and 7. The local maxima and minima indicate the locations of potential boundary positions. The boundary positions may be used to develop a wellbore trajectory to penetrate formation layers suitable for producing a formation fluid, such as a hydrocarbon.

Figure 10:
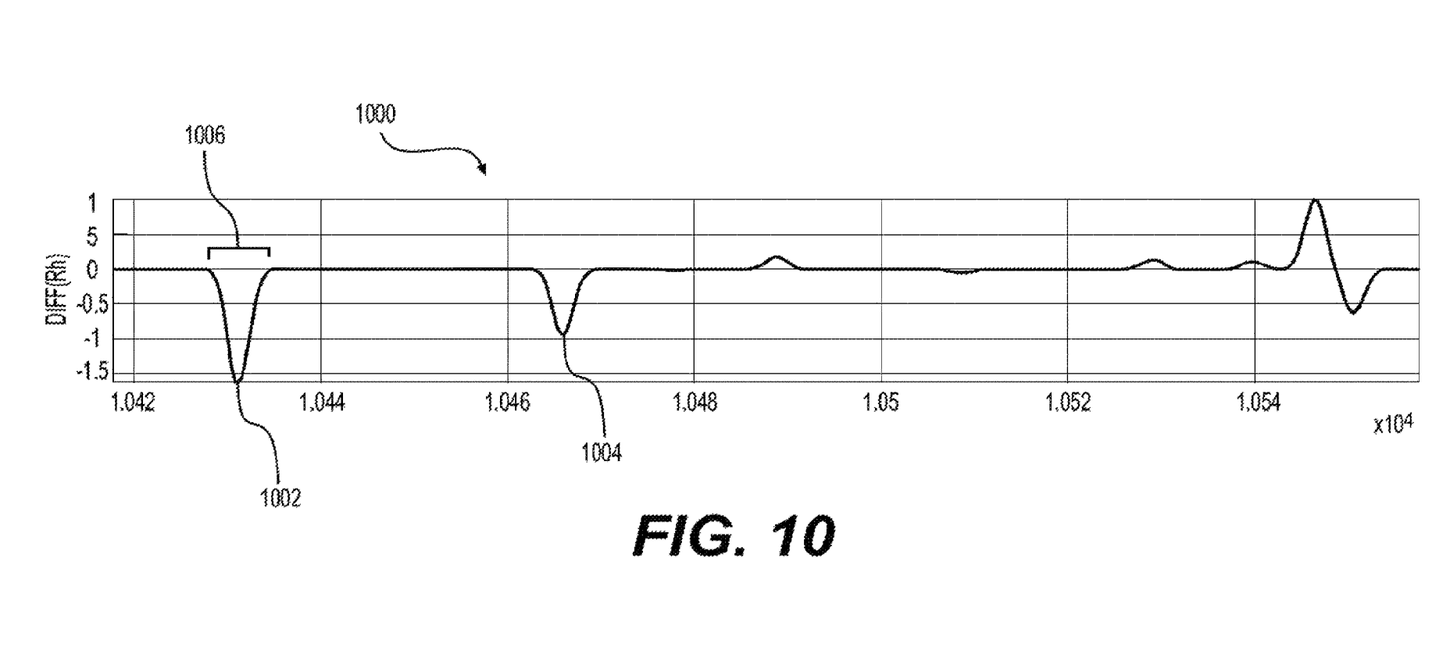
FIG. 10 depicts a graph view of a smoothed uncertainty profile, in accordance with one or more embodiments.

FIG. 10 shows a graph view of a smoothed uncertainty profile 1000, in accordance with one or more embodiments. The smoothed uncertainty profile 1000 is generated by filtering the boundary uncertainty profile using the convolution smoothing function u as previously discussed. After smoothing, the boundary positions may be identified as the local maxima and minima (1002 and 1006) in the smoothed uncertainty profile. The boundary position uncertainty may be identified as the width 1002 of each peak or as a value less than the peak width (e.g., a half peak width). The boundary position uncertainty provides a range of TVDs where the boundary position may exist. Similar to the contour plot depicted in FIG. 8, a contour plot of the boundary uncertainty may also be formed to evaluate the formation and identify boundary positions.

At block 310, the boundary positions, which are identified using the various graphs (FIGS. 5-9) or averaged pixelated solutions as previously discussed, may also be used to evaluate the formation, identify a wellbore trajectory, and/or steer a drill bit (e.g., the drill bit 14 of FIG. 1) through or toward a formation layer suitable for producing formation fluids. For example, a formation layer suitable for producing formation fluids may exist between peaks 1002 and 1004 depicted in FIG. 10. In addition to the peaks 1002 and 1004 indicating the location of the boundary positions, the boundary position uncertainties are indicated by the widths of the peaks 1002 and 1004. The widths of the peaks 1002 and 1004 indicate the range of TVDs where the boundary positions may exist as well. A drill bit may be steered or a wellbore trajectory may be developed to pass between the peak widths of peaks 1002 and 1004.

It should be appreciated that the system and methods described herein provide a solution necessarily rooted in downhole deep resistivity logging tools in order to overcome a problem specifically arising from inversion methods used to determine formation properties from the formation data measured using the deep resistivity logging tools. Inversion methods using formation data from the deep resistivity logging tools can provide hundreds of solutions at a single measurement depth of the resistivity logging tool, posing problems in evaluating the inversion solutions, such as identifying a formation model indicative of the formation properties and the corresponding uncertainties. The methods and system described herein summarize the inversion solutions using a mean value of pixelated solutions to evaluate the formation, identify a wellbore trajectory, and/or steer a drill bit for producing formation fluids.

In addition to the embodiments described above, many examples of specific combinations are within the scope of the disclosure, some of which are detailed below:

Example 1: A system for evaluating a subterranean earth formation, comprising:
    a logging tool operable to measure formation data and locatable in a wellbore intersecting the subterranean earth formation; and
    a processor in communication with the logging tool and operable to:
        calculate multiple distance-to-bed-boundary (DTBB) solutions using the measured formation data,
        identify DTBB solutions that satisfy a threshold,
        convert the identified solutions into pixelated solutions by dividing the identified solutions into pixels,
        generate a formation model based on the pixelated solutions, and
        evaluate the formation using the generated formation model.

Example 2: The system of example 1, wherein the logging tool comprises a resistivity logging tool operable to measure the resistivity of the formation.

Example 3: The system of example 1, wherein the processor is further operable determine the uncertainty of the parameter based on the pixelated solutions.

Example 4: The system of example 3, wherein the uncertainty of the parameter is determined based on the standard deviation of the parameter determined from the formation model.

Example 5: The system of example 3, wherein the uncertainty of the parameter is determined based on the derivative of a horizontal resistivity determined from the formation model.

Example 6: The system of example 3, wherein the parameter includes any one or any combination of a horizontal resistivity, an anisotropy ratio, a boundary position of formation layers, and a formation dip.

Example 7: The system of example 3, wherein the uncertainty of the parameter is determined by applying a filter to the derivative of a horizontal resistivity derived from the formation model.

Example 8: The system of example 3, wherein the uncertainty of the parameter is determined by applying a filter to a derivative of a horizontal resistivity determined from the formation model and identifying a peak width of the convoluted derivative.

Example 9: The system of example 1, wherein the formation model is generated by calculating a mean of the pixelated solutions.

Example 10: The system of example 9, wherein the mean is calculated by not including outlier pixels among the pixelated solutions.

Example 11: A method of evaluating a subterranean earth formation, comprising:

measuring formation data in a wellbore intersecting the subterranean earth formation using a logging tool, calculating multiple distance-to-bed-boundary (DTBB) solutions using the measured formation data, identifying DTBB solutions that satisfy a threshold, converting the identified solutions into pixelated resistivity solutions by dividing the identified solutions into pixels, generating a formation model based on the pixelated solutions, and evaluating the formation using the formation model.

Example 12: The method of example 11, wherein the logging tool comprises a resistivity logging tool operable to measure the resistivity of the formation.

Example 13: The method of example 11, further comprising determining the uncertainty of a parameter based on the formation model.

Example 14: The method of example 13, wherein determining the uncertainty of the parameter comprises calculating a standard deviation of the parameter based on the formation model.

Example 15: The method of example 13, wherein determining the uncertainty of the parameter comprises:

calculating a derivative of a horizontal resistivity determined from the formation model;

applying a convolution method to the derivative of the horizontal resistivity; and identifying a peak width of the convoluted derivative, wherein the uncertainty of the parameter includes the peak width.

Example 16: The method of example 13, wherein the parameter includes any one or any combination of a horizontal resistivity, an anisotropy ratio, a boundary position of formation layers, and a formation dip.

Example 17: The method of example 11, wherein generating the formation model comprises calculating a mean of the pixelated resistivity solutions.

Example 18: The method of example 15, wherein the mean is calculated by not including outlier pixels among the pixelated solutions from the calculation.

Example 19: A method of steering a drill bit in a subterranean earth formation, comprising:

measuring formation data in a wellbore intersecting the subterranean earth formation using a logging tool located in the wellbore, calculating multiple distance-to-bed-boundary (DTBB) solutions based on the measured formation data, identifying DTBB solutions that satisfy a threshold, converting the identified solutions into pixelated solutions by dividing the identified solutions into pixels, generating a formation model based on the pixelated solutions, identifying a wellbore trajectory based on the formation model, and steering a drill bit according to the wellbore trajectory.

Example 20: The method of example 19, further comprising:

determining the uncertainty of a parameter of the formation based on the formation model by calculating a derivative of a horizontal resistivity derived from the formation model, applying a convolution method to the derivative of the horizontal resistivity, and identifying a peak width of the convoluted derivative, wherein the uncertainty of the parameter includes the peak width.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A system for evaluating a subterranean earth formation, comprising:

a logging tool locatable in a wellbore intersecting the subterranean earth formation and operable to measure formation data at different measurement depths along the wellbore; and a processor in communication with the logging tool and operable to:

generate multiple distance-to-bed-boundary (DTBB) solutions at a measurement depth using a DTBB inversion method with the measured formation data for the measurement depth, identify the DTBB solutions that satisfy a residual threshold relative to the measured formation data, convert only the identified solutions into pixelated solutions by dividing the identified solutions into pixels, generate a formation model based on the pixelated solutions, and evaluate the formation using the generated formation model.

2. The system of claim 1, wherein the logging tool comprises a resistivity logging tool operable to measure the resistivity of the formation.

3. The system of claim 1, wherein the processor is further operable determine an uncertainty of a parameter from the measured formation data based on the pixelated solutions.

4. The system of claim 3, wherein the uncertainty of the parameter is determined based on the standard deviation of the parameter determined from the formation model.

5. The system of claim 3, wherein the uncertainty of the parameter is determined based on the derivative of a horizontal resistivity determined from the formation model.

6. The system of claim 3, wherein the parameter includes any one or any combination of a horizontal resistivity, an anisotropy ratio, a boundary position of formation layers, and a formation dip.

7. The system of claim 3, wherein the uncertainty of the parameter is determined by applying a filter to the derivative of a horizontal resistivity derived from the formation model.

8. The system of claim 3, wherein the uncertainty of the parameter is determined by applying a filter to a derivative of a horizontal resistivity determined from the formation model and identifying a peak width of the convoluted derivative.

9. The system of claim 1, wherein the formation model is generated by calculating a mean of the pixelated solutions.

10. The system of claim 9, wherein the mean is calculated by not including outlier pixels among the pixelated solutions.

11. A method of evaluating a subterranean earth formation, comprising:
  measuring formation data at different measurement depths in a wellbore intersecting the subterranean earth formation using a logging tool;
  transmitting the formation data to a computer system comprising a processor at the surface of the earth;
  generating, with the processor, multiple distance-to-bed-boundary (DTBB) solutions at a measurement depth using a DTBB inversion method with the measured formation data for the measurement depth;
  identifying, with the processor, the DTBB solutions that satisfy a residual threshold relative to the measured formation data;
  converting, with the processor, only the identified solutions into pixelated solutions by dividing the identified solutions into pixels;
  generating, with the processor, a formation model based on the pixelated solutions; and
  evaluating the formation using the formation model.

12. The method of claim 11, wherein the logging tool comprises a resistivity logging tool operable to measure the resistivity of the formation.

13. The method of claim 11, further comprising determining an uncertainty of a parameter based on the formation model.

14. The method of claim 13, wherein determining the uncertainty of the parameter comprises calculating a standard deviation of the parameter based on the formation model.

15. The method of claim 13, wherein determining the uncertainty of the parameter comprises:
  calculating a derivative of a horizontal resistivity determined from the formation model;
  applying a convolution method to the derivative of the horizontal resistivity; and
  identifying a peak width of the convoluted derivative, wherein the uncertainty of the parameter includes the peak width.

16. The method of claim 13, wherein the parameter includes any one or any combination of a horizontal resistivity, an anisotropy ratio, a boundary position of formation layers, and a formation dip.

17. The method of claim 11, wherein generating the formation model comprises calculating a mean of the pixelated resistivity solutions.

18. The method of claim 17, wherein the mean is calculated by not including outlier pixels among the pixelated solutions from the calculation.

19. A method of steering a drill bit in a subterranean earth formation, comprising:
  measuring formation data at different measurement depths in a wellbore intersecting the subterranean earth formation using a logging tool located in the wellbore;
  transmitting the formation data to a computer system comprising a processor at the surface of the earth;
  generating, with the processor, multiple distance-to-bed-boundary (DTBB) solutions at a measurement depth using a DTBB inversion method with the measured formation data for the measurement depth;
  identifying, with the processor, the DTBB solutions that satisfy a residual threshold relative to the measured formation data;
  converting, with the processor, only the identified solutions into pixelated solutions;
  generating, with the processor, a formation model based on the pixelated solutions;
  identifying a wellbore trajectory based on the formation model; and
  steering a drill bit according to the wellbore trajectory.

20. The method of claim 19, further comprising determining an uncertainty of a parameter of the formation based on the formation model by calculating a derivative of a horizontal resistivity derived from the formation model, applying a convolution method to the derivative of the horizontal resistivity, and identifying a peak width of the convoluted derivative, wherein the uncertainty of the parameter includes the peak width.

* * * * *